3,379,797
METHOD FOR MAKING HOLLOW SPHERICAL RESINOUS PARTICLES

John F. McHugh, Wayne, N.J., assignor to Interchemical Corporation, New York, N.Y., a corporation of Ohio
No Drawing. Filed Oct. 14, 1965, Ser. No. 496,146
5 Claims. (Cl. 264—9)

This invention relates to a novel method for making hollow spherical resinous particles particularly particles under 100 microns in diameter.

Such small hollow resinous particles have several uses in industry. They can be used in mass to produce resinous structures of lowered density as compared to a solid structure of the same resin. These structures are similar to foam and may be used as a substitute for foam. Also, these structures and other materials made of the particles of this invention may be used as insulation.

The hollow spherical particles are also useful in forming "floating roofs" to prevent evaporation of liquids such as crude oil in storage tanks.

Our method comprises emulsifying a solution of a film-forming resin dissolved in a volatile solvent in a continuous liquid phase which is a non-solvent for said resin. The non-solvent is less volatile than the solvent and the solvent and non-solvent are immiscible. The emulsion is then heated to evaporate the solvent. We have found that for best results the evaporation is conducted below the boiling point of the solvent. The turbulence caused by boiling appears to interfere with the formation of the hollow spherical particles to some extent. The evaporation is preferably conducted at a maximum temperature of about 3° C. below the boiling point of the solvent.

During the evaporation of the solvent, it is preferred to maintain the emulsion under continuous agitation. The agitation should be sufficient to maintain the emulsion at a constant degree of emulsification, that is at a fairly uniform droplet size throughout the period when the droplets are solidifying by loss of solvent.

The dissolved resin comes out of solution as hollow spherical particles. By controlling the degree of emulsification (the droplet size), the size of the spherical particles produced may be controlled. The method of this invention may be used to produce hollow spherical particles ranging in size from 1 to 1,000 microns.

The resinous particles may contain various conventional pigments as well as fillers such as clay and silica. The fillers or pigments are dispersed in the solution of the resin in the solvent. In the particles produced, the fillers or pigments end up being dispersed in the resin forming the walls.

Virtually any film-forming resin which is soluble in the internal phase solvent and insoluble in the continuous phase non-solvent may be used. In addition to homopolymers and copolymers of styrene, cellulosics and vinyl resins, thermosetting resins such as phenol-formaldehyde, amine-aldehyde, epoxy resins and polyester resins may be used in making the particles.

In accordance with one aspect of this invention it has been found that the particles produced by this invention may be used in developers for electrostatic printing. Particles of styrene containing carbon black pigment have been found to make an excellent dry powder developer for electrostatic printing when formulated with iron filings, preferably from 10 to 200 parts of iron filings being used for each part of the spherical particles.

It has been found that the pigmented hollow spherical particles of the type used in this invention when formulated and used as developers in electrostatic printing processes of the type described in U.S. Patent 3,052,539 give less undesirable background smudging than do pigmented resins of the same composition but made by conventional milling methods. This advantage is believed due to the spherical shape of the particles which permits the particles to be rolled off the non-image areas more readily than the conventional particles which are irregular in shape.

Unless otherwise indicated, all proportions in this specification and claims are by weight.

In forming the emulsions, preferably from 2 to 10 parts of the continuous phase are used for each part of the internal phase. As for the internal phase, preferably close to the maximum amount of resin which will produce a solution having a viscosity below 200 poises is used. Usually in order of 0.05 to 1.0 parts of resin are preferably used for each part of solution.

The solvent and non-solvent must be immiscible with each other and the solvent must be more volatile. Any such combination selected from conventional solvents may be used e.g., water and a non-polar solvent such as benzene or mineral oil and a polar solvent such as acetone. It is preferable that the solvent have an evaporation rate which is at least twice that of the non-solvent or continuous phase.

The following examples will illustrate the practice of this invention.

Example 1

3 parts of carbon black pigment are dispersed in a solution of 30 parts of polystyrene in 70 parts of benzene. Then 100 parts of this dispersion are added slowly to 200 parts of a water solution containing 2% by weight of carboxymethyl cellulose and 1% of triethanol amine while agitating vigorously on a Waring Blendor.

The emulsion of the benzene solution in water is then transferred to a vessel to which heat may be applied, and the emulsion is heated at about 75° C. to evaporate the benzene while agitating the emulsion at a rate sufficient to maintain the solidifying droplets at a constant droplet size. Heating is continued until the benzene is completely evaporated.

Then the temperature of the resulting mixture is reduced to ambient temperature and the solid material formed is removed by filtration. The solid material consists of hollow spherical particles in the range of from 1 to 10 microns in diameter. Microscopic examination of the particles indicates that the walls of the spherical particles are formed of polystyrene containing dispersed carbon black particles.

Example 2

A solution of 6 parts of cellulose acetate in 35 parts of acetone are emulsified in a 1% solution of glyceryl monostearate in mineral oil on a homogenizer (Virtis). The mixture is then slowly heated to 47° C. under agitation. Then the emulsion is maintained at 44° to 47° C. over a two-hour period to evaporate the acetone while agitating the emulsion at a rate sufficient to maintain the solidifying droplets at a constant droplet size.

The temperature of the resulting mixture is lowered to the ambient temperature and the solid material is removed by filtration. The solid material consists of hollow spherical particles of cellulose acetate having an average diameter of about 50 microns.

Example 3

Example 1 may be repeated using the same procedure, ingredients, proportions and conditions except that in place of the polystyrene, a copolymer of styrene and butadiene is used.

Example 4

Example 2 may be repeated using the same procedure, ingredients, proportions and conditions except that in place of the cellulose acetate, a copolymer of 88% vinyl chloride and 12% vinyl acetate is used.

Example 5

The spherical particles of Example 1 are mixed with iron filings in ratios varying from 20:1 to 5:1 iron filings:spherical particles. The resulting mixtures are used to print electrostatically in apparatus like that described in U.S. Patent 3,052,539 wherein a photoconductive coated sheet is negatively charged, then exposed to a light image leaving a latent electrostatic image. The latent image is developed by applying the mixture to the latent image and then fixing the powder to the sheet. The resulting image is clear, has good fill-in and definition and a substantially clear background.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for producing hollow substantially spherical resinous particles which comprises emulsifying a solution of a film-forming resin dissolved in a volatile solvent in a liquid continuous phase which is a non-solvent for said resin, is immiscible with said solvent and is less volatile than said solvent and heating said emulsion at a maximum temperature of about 3° C. below the boiling point of said solvent to remove the solvent by evaporation while applying sufficient agitation to the emulsion to maintain the resin solution at a constant degree of emulsification during the evaporation whereby the dissolved resin comes out of solution as hollow substantially spherical particles.

2. The method of claim 1 wherein the solution of resin has dispersed therein a pigment whereby the spherical particles have pigment dispersed in the resin.

3. The method of claim 1 wherein the solution of resin has dispersed therein a filler whereby the spherical particles have filler dispersed in the resin.

4. The method of claim 1 wherein the continuous phase is water and the solvent is a non-polar solvent.

5. The method of claim 1 wherein the continuous phase is mineral oil and the solvent is a polar solvent.

References Cited

UNITED STATES PATENTS

| | | | |
|---|---|---|---|
| 2,027,114 | 1/1936 | Olsen et al. | 149—2 |
| 2,974,135 | 3/1961 | Andrew | 264—9 |

ROBERT F. WHITE, *Primary Examiner.*

J. R. HALL, *Assistant Examiner.*